United States Patent
Mehri et al.

(10) Patent No.: US 7,028,384 B2
(45) Date of Patent: Apr. 18, 2006

(54) METHOD AND DEVICE FOR PROCESSING CABLES

(75) Inventors: Urs Mehri, Stans (CH); Alois Lustenberger, Littau (CH)

(73) Assignee: Komax Holding AG, Dierikon (CH)

( * ) Notice: Subject to any disclaimer, the term of this patent is extended or adjusted under 35 U.S.C. 154(b) by 386 days.

(21) Appl. No.: 10/454,582

(22) Filed: Jun. 5, 2003

(65) Prior Publication Data
US 2003/0226426 A1    Dec. 11, 2003

(30) Foreign Application Priority Data
Jun. 6, 2002    (EP) .................................. 02405457

(51) Int. Cl.
*B23P 23/00* (2006.01)
(52) U.S. Cl. ...................... 29/564.6; 29/564.4; 29/749; 29/745; 29/747; 29/748; 29/33 F; 29/857; 29/861; 29/863; 83/9.51; 83/13; 83/76.8; 83/947
(58) Field of Classification Search ............... 29/564.6, 29/564.4, 749, 745, 747, 748, 33 F, 857, 29/861, 863; 81/9.51, 13, 76.8, 947
See application file for complete search history.

(56) References Cited

U.S. PATENT DOCUMENTS

| 4,554,725 | A |   | 11/1985 | Over et al. |         |
|-----------|---|---|---------|-------------|---------|
| 4,713,880 | A | * | 12/1987 | Dusel et al. | 29/564.4 |
| 5,445,051 | A |   | 8/1995  | Carpenter et al. |     |
| 5,781,984 | A | * | 7/1998  | Koch et al. | 29/564.4 |
| 6,658,719 | B1| * | 12/2003 | Thoms et al. | 29/564.4 |
| 6,675,458 | B1| * | 1/2004  | Davidson et al. | 29/564.4 |
| 6,886,438 | B1| * | 5/2005  | Viviroli et al. | 83/13 |

FOREIGN PATENT DOCUMENTS

| EP | 1 174 970 A1 | 1/2002 |
| WO | WO 95/13641 A1 | 5/1995 |
| WO | WO 97/17751 A1 | 5/1997 |

* cited by examiner

*Primary Examiner*—Richard Chang
(74) *Attorney, Agent, or Firm*—Venable LLP; Stuart I. Smith

(57) ABSTRACT

A device is suggested for processing cable-shaped conductors, particularly multicore cables, having at least one transport means (126) having a drive means (132) for transport supply and/or for lengthwise transport of cable-shaped conductor material (200), a cutting means (170) for cutting through cable-shaped conductor material, at least one first means (170) for processing the cut, cable-shaped conductor material, at least one guide means (130) for lengthwise guiding of the cable-shaped conductor material, the guide means (130) being implemented so that the free end of the cable-shaped conductor material may be pivoted out of its lengthwise direction, and at least one plate (110), implemented essentially perpendicularly to the cable direction, on which at least some of the means (126, 128, 130) of the device are positioned on one side. The plate (110) has at least one first pivotable plate part (114), which is pivotably positioned around an axis essentially parallel to the plate plane between two end positions using a first pivot angle, at least one of the transport means (126) cited and a guide means (130) being located on the plate part (114). At least one second means (172) is provided for processing the cable-shaped conductor material, which is arranged in a state of the first pivotable plate part (114) pivoted out of the plane of the plate (110) or may be arranged replaceably.

6 Claims, 9 Drawing Sheets

METHOD AND DEVICE FOR PROCESSING CABLES

BACKGROUND OF THE INVENTION

1. Field of the Invention

The present invention relates to a device for processing cable-shaped conductors, e.g., a device for stripping and/or pulling off sheathing materials from multicore cable-shaped conductors. Furthermore, the present invention relates to a method of stripping and/or pulling off sheathing materials from multicore, cable-shaped conductors, the pulling off of the sheathing material able to be performed in such a way that the insulating material removed remains on the cable to protect the remaining conductor end.

2. Description of the Related Art

The procedure for cutting off cable-shaped conductor pieces and for stripping one or both cable ends and devices configured for this procedure are already known. In this case, for a multicore cable, in which each cable core is sheathed (insulated) individually and in addition a shared sheathing forms the outer envelope of the cable, typically first this outer sheathing is removed on a predetermined part with the aid of a first stripping blade and then the sheathing of the individual conductors (cores) of the multicore cable is cut with the aid of a multipart blade and either removed or only partially pulled off, in order to provide the cable or strand ends with a protection against untwisting, for example. The cable end is then pushed forward by the amount which corresponds to the desired length of the cable part to be produced, the cable is cut off at this point—with the first stripping blade, for example—and the procedure described is repeated on the rear end of the cable. However, the conductor ends are then further processed in that, for example, a crimp part or another element (e.g., a sensor etc.) is attached to them or that they are twisted, as is known, for example, from WO-A-99/52188. During the stripping, the problem arises— which is already known and also already solved in principle—that to strip the sheathing, specifically both the outer sheathing and the individual conductor sheathing, the rear cable ends to be processed must be pushed back by the length which corresponds to the stripping length(s). These ends which are pushed back then collide with the just-cut ends of the cable supplied. For this problem, the solution is known in which the cable ends supplied are kept guided between the last transport element for the processing point and the processing point in a guide sleeve or another guide element and this guide sleeve is pivoted out of the cable alignment during the processing of the rear cable end. Such a typical transport element is also known from European Patent Application 0 864 524 and described best there. Another solution is, for example, known from European Patent Application 0 234 929. Alternatively, it has also already been suggested—in order to be able to keep the distances small between the last transport element before the processing point and the processing point—to move a guide sleeve linearly out of the cable run direction (WO-A-97/17751), through which the distances may be kept smaller, but for which a return movement of the cut front end of the cable in the full extent of the length of the guide element must be accepted, which may significantly impair the precision of the method.

A typical arrangement for performing the procedure described is described in WO-A-99/52188, in which the guide sleeves are pivoted upward. The blades, namely the stripping blade for the outer cable sheathing and the multipart blade for the individual conductors, are located in one line in this case, namely the cable guide direction, the central single blade of the multipart blade being positioned in this direction, but the further blades of the multipart blade lying to the left and right of it. Since, to the applicants, this document represents the most technically advanced related art, it is incorporated in the content of the disclosure of this patent application through reference.

In the framework of the present invention, this device will be refined, the following desired improvements to be fulfilled. On one hand, the arrangement of the processing elements (e.g., the blades) on one line in the direction of the cable guide does lead to the processing being able to be performed solely through movement of the cable sections on this line, if the pivoting out of the cut cable end is disregarded. However, on the other hand, the processing is restricted by the present arrangement. For each additional processing step, such as the attachment of a crimp part or another element (e.g., a sensor etc.), the additional processing elements for twisting of the cable end must be incorporated into the processing path at a certain cost. Modular construction with the possible replacement of additional processing elements is therefore only possible with difficulty. On the other hand, it is especially advantageous— even in the device according to WO-A-99/52188—if the drive devices for the cable transport are positioned on one side of the device, namely in the rear in relation to a vertical plane through the cable guide direction, while the device is kept easily accessible at the front. This requirement may be implemented, for example, through a vertical termination plate.

A device is known from European Patent Application 1 174 970, in which the guide sleeves and the transport device are mounted on a plate and this plate is implemented so it may be pivoted out of its plane together with the guide sleeves. At the same time, it is suggested in European Patent Application 1 174 970 that a front and a rear plate be made rotatable in relation to the plate plane. In this way, the problem of being able to rotate or pivot the cut cable ends out is solved, but this is done at the cost of easy accessibility.

SUMMARY OF THE INVENTION

The refinement of a device according to the species in accordance with the desires stated above therefore results in the object of the present invention.

It is therefore the object of the present invention to suggest a device in which the cable ends may be processed in further processing stations, in that their cores are stripped or, for example, a crimp part or another element (e.g., a sensor etc.) is attached and/or they are twisted. According to the object of the present invention, the cable ends must be guided and it is to be possible to introduce different processing devices modularly and replace them as easily as possible. All of these requirements are not to be at the cost of accessibility.

The present invention achieves the object through a device for processing cable-shaped conductors particularly multicore cables, comprising

- at least one transport means having a drive means for transport supply and/or for lengthwise transport of cable-shaped conductor material,
- a cutting means for cutting through cable-shaped conductor material,
- at least one first means for processing the cut, cable-shaped conductor material,
- at least one guide means for lengthwise guiding of the cable-shaped conductor material, at least one plate, implemented essentially perpendicularly to the cable direction, on which at least some of the means of the device are positioned on one side, wherein the plate cited has at least one first pivotable plate part, which is pivotably positioned around an axis essentially parallel to the plate plane between two end positions using a first pivot angle, at least one of the transport means cited and a guide means being located on the plate part, and at least one second means is provided for processing the cable-shaped conductor material, which is arranged in a state of the first pivotable plate part pivoted out of the plane of the plate or may be arranged replaceably.

In this case, the measures of the present invention first have the consequence that good accessibility to the cable-guiding elements is maintained, but a very flexible arrangement is offered for the introduction and leaving out of processing elements. It is also advantageous to connect the measures of the present invention with the use of a guide sleeve, i.e., a guide tube, which may be magnetically pivoted upward, for example, since then pivoting movements of the front cable and are made possible in two different directions, which are orthogonal to one another and to the cable direction. This achievement of the object is considered its own contribution according to the present invention.

If the plate parts are each pivoted out of a base position, in which these plate parts essentially form a plane with a baseplate—or, if this baseplate is dispensed with, with one another—into a pivoted position, a pneumatic pivot drive is advantageously used. However, if the plate parts are each to be pivoted out of the base position into, for example, two different positions, an electric pivot drive having a stepping motor is advantageous.

A method of processing cable-shaped conductors, particularly multicore cables, comprises the steps of using a first processing means, a first processing of the cable is performed essentially on the line of the cable guide, particularly cutting through the cable and stripping an outer cable sheathing, a first pivotable plate part, on which one of the transport means cited as well as a guide means are located, are pivoted around an axis essentially parallel to the plate plane, using a first pivot angle, and using a second processing means for processing the cable-shaped conductor material, which is arranged in a state of the first pivotable plate part pivoted out of the plane of the plate or may be arranged replaceably, a second processing of the cable is performed in the pivoted-out state according to a further aspect of the invention, is particularly advantageous.

Further advantageous characteristics of the present invention are described in the dependent claims.

The elements cited above, as well as those claimed and those described in the following exemplary embodiments, to be used according to the present invention, are not subject to any special conditions in regard to their size, shape, materials used, or technical conception, so that the selection criteria known in the respective field of application may be used without restriction.

Furthermore, the device is not restricted to electrical cable-shaped conductors. Both the device and the method may also be used for other cable-shaped conductors, e.g., optical waveguides, etc.

BRIEF DESCRIPTION OF THE DRAWINGS

Further characteristics, features, and advantages of the object of the present invention result from the following description of the associated drawing, in which a device and an associated method sequence for the present invention are described for exemplary purposes.

DETAILED DESCRIPTION OF EMBODIMENTS OF THE INVENTION

Figure 1:
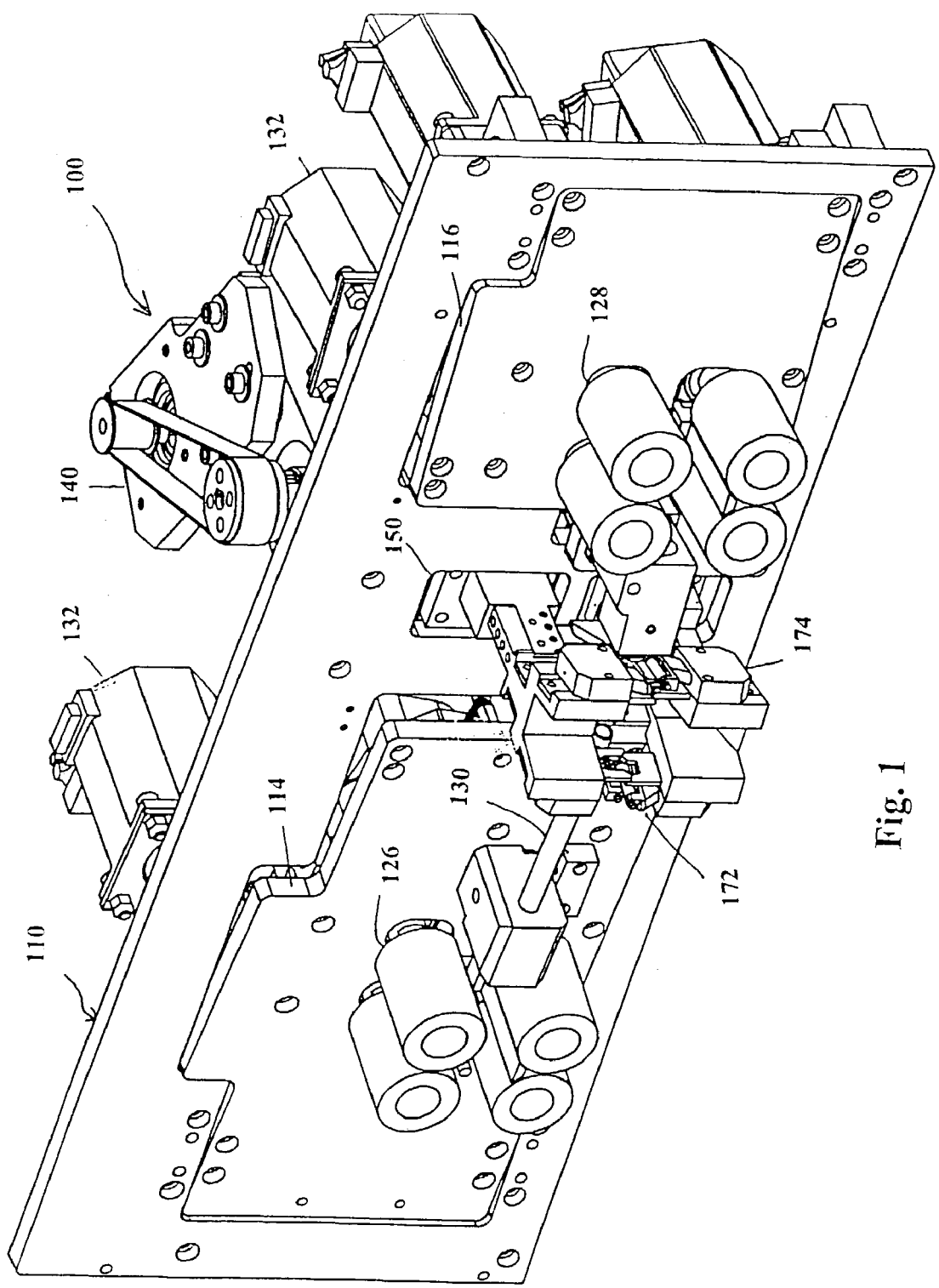
FIG. 1 shows a perspective illustration of the device according to the present invention, in which both pivoting parts are pivoted out into the position of the further processing units.

The essential elements of the device indicated as a whole with 100 in FIG. 1 are positioned on the plate 110, which comprises a baseplate 112 and two pivotable plate parts 114 and 116 in the exemplary embodiment. The two pivotable plate parts 114 and 116 are mounted pivotably around a pivot angle around pivot points 118 and 120, respectively; the pivot points 118 and 120 are each the bearing centerpoints of a pivot bearing 122 and 124, respectively, which are each attached to the baseplate 110. The pivot axes are provided behind the plate 110 in the present exemplary embodiment, however, they may also—alternatively—be provided in the plate plane.

Figure 2:
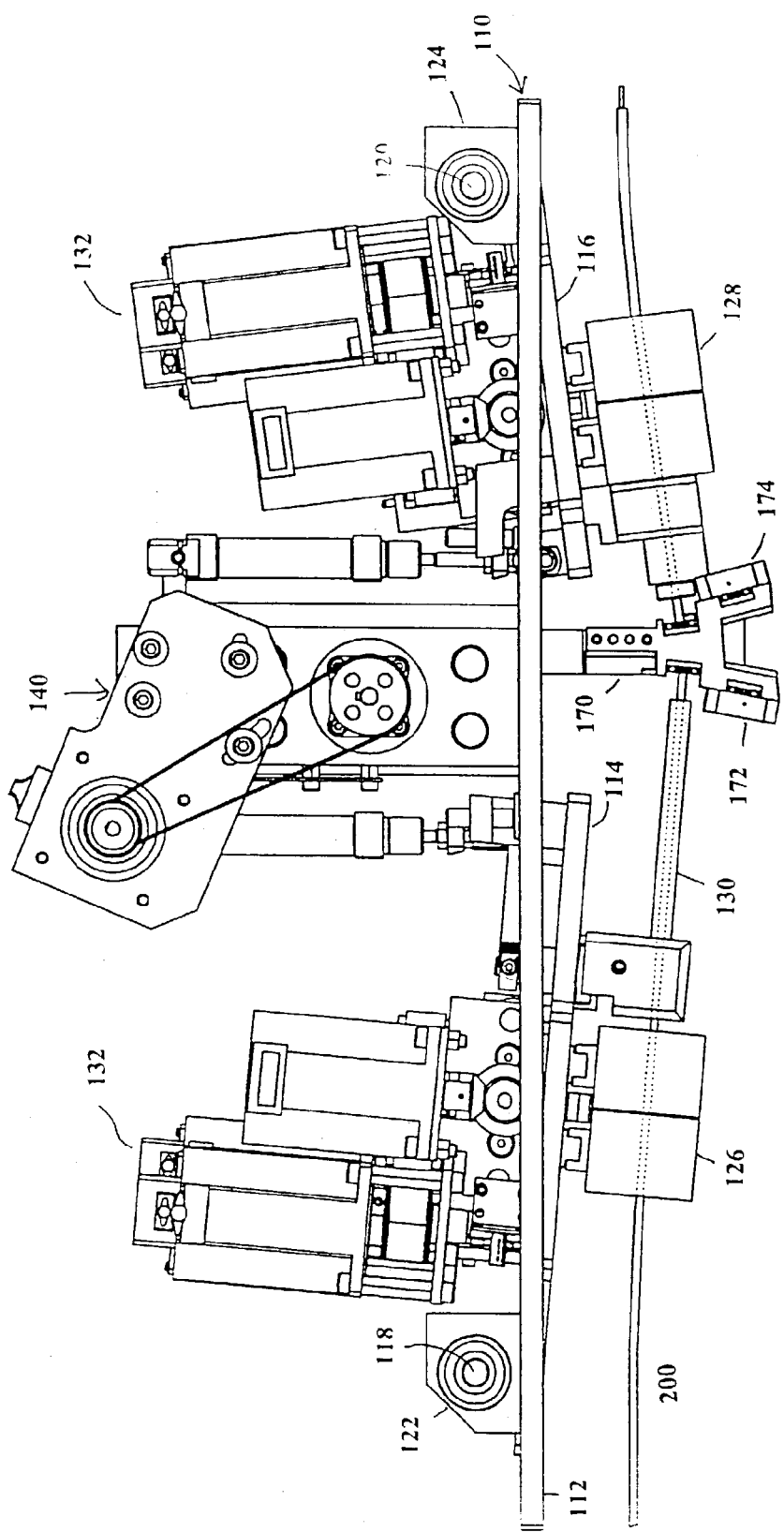
FIG. 2 shows a top view of the device shown in FIG. 1, in this drawing the cable is also shown.
Figure 3:
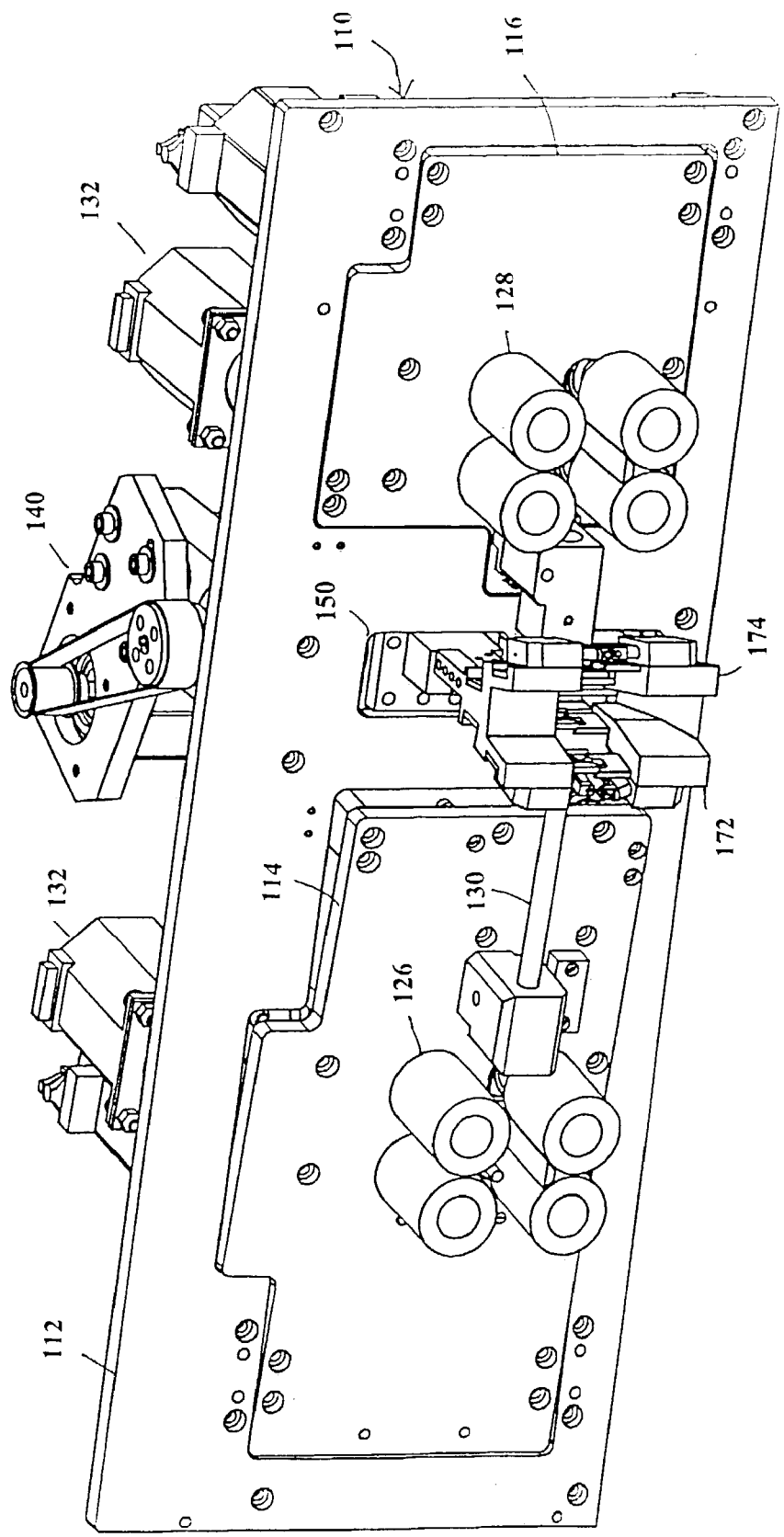
FIG. 3 shows a perspective illustration of the device shown in FIG. 1, in which the front pivoting part is pivoted out into the position of the further processing unit, while the rear pivoting part is pivoted into the position of the first processing unit.
Figure 4:
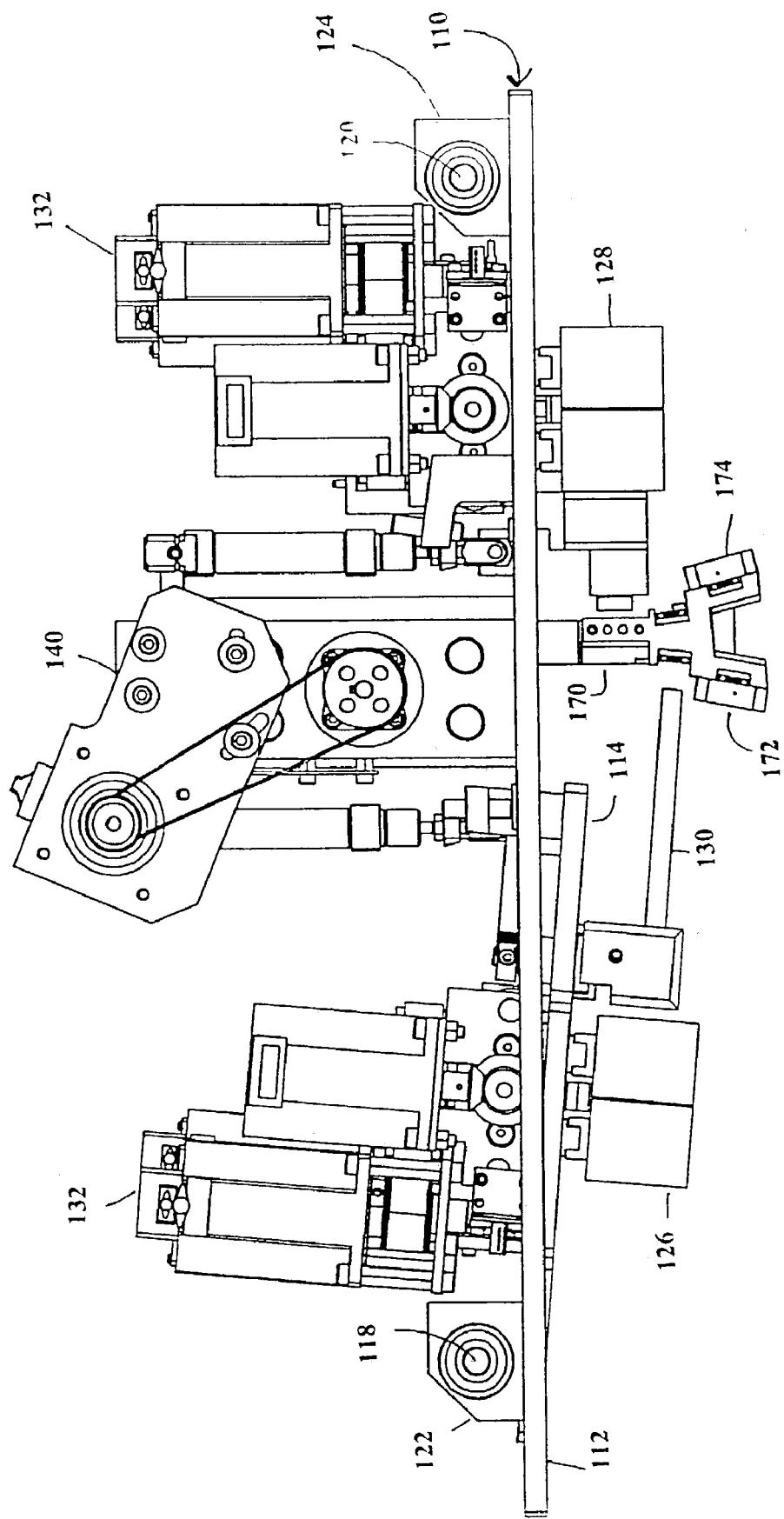
FIG. 4 shows a top view of the device shown in FIG. 3.
Figure 5:
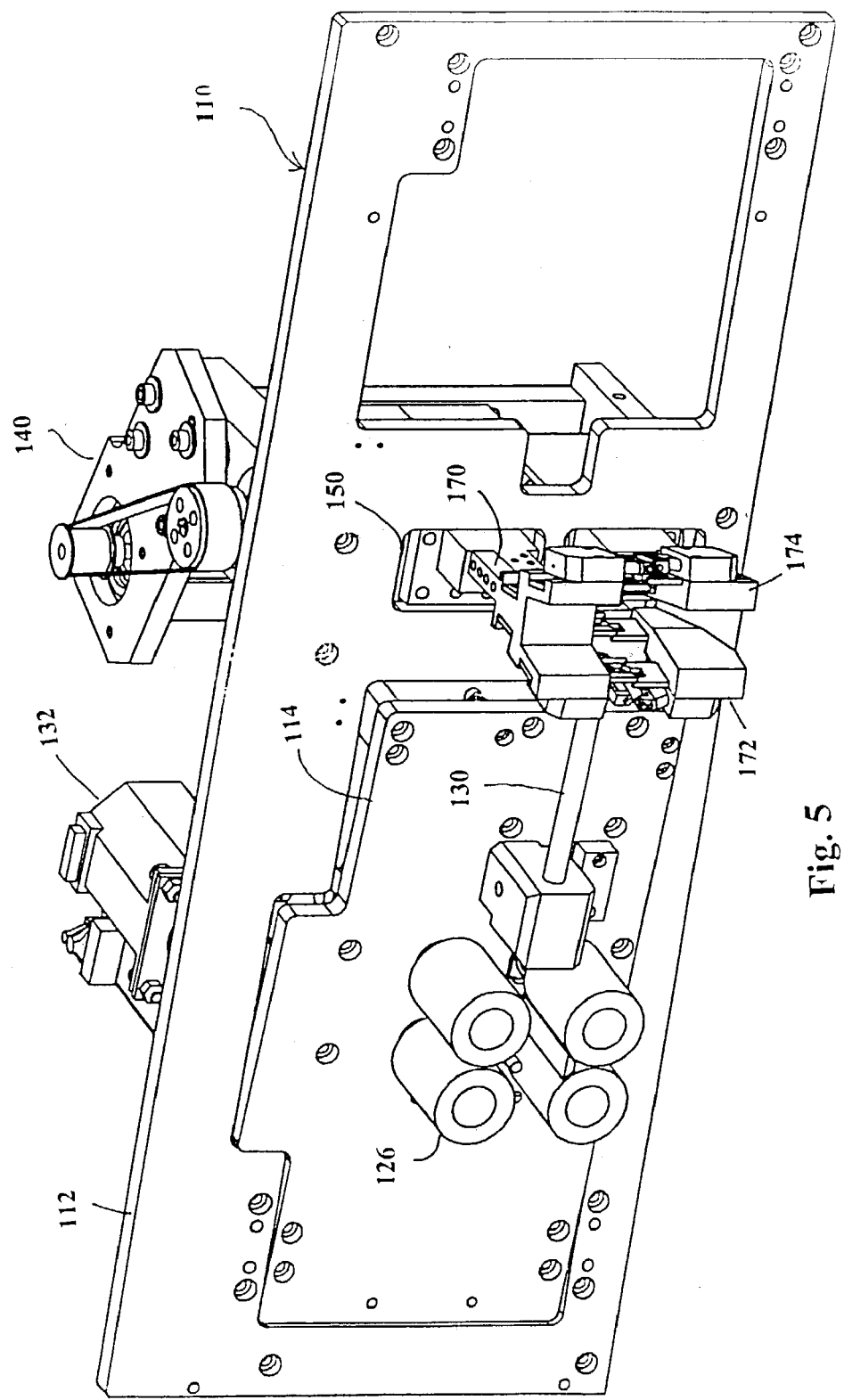
FIG. 5 shows an illustration according to FIG. 3, in which the rear pivoting part has been removed.
Figure 6:
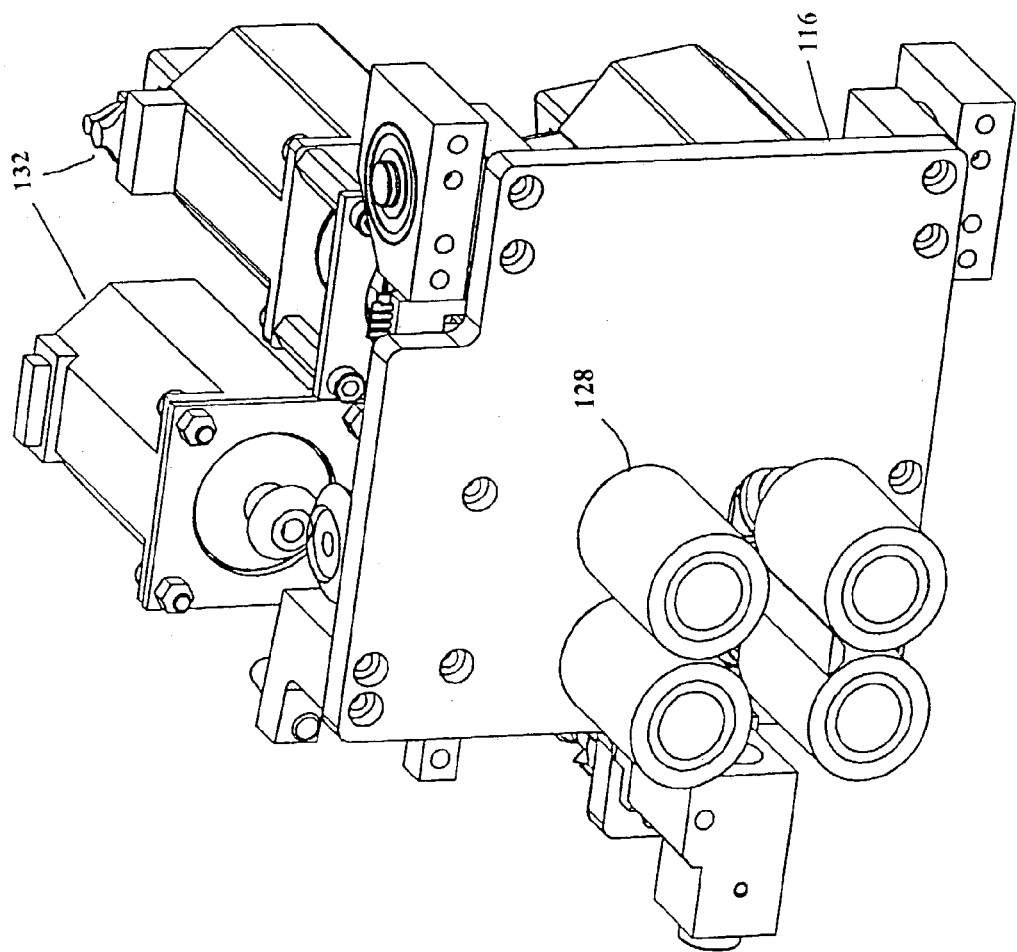
FIG. 6 shows a perspective illustration of the rear pivoting part.
Figure 7:
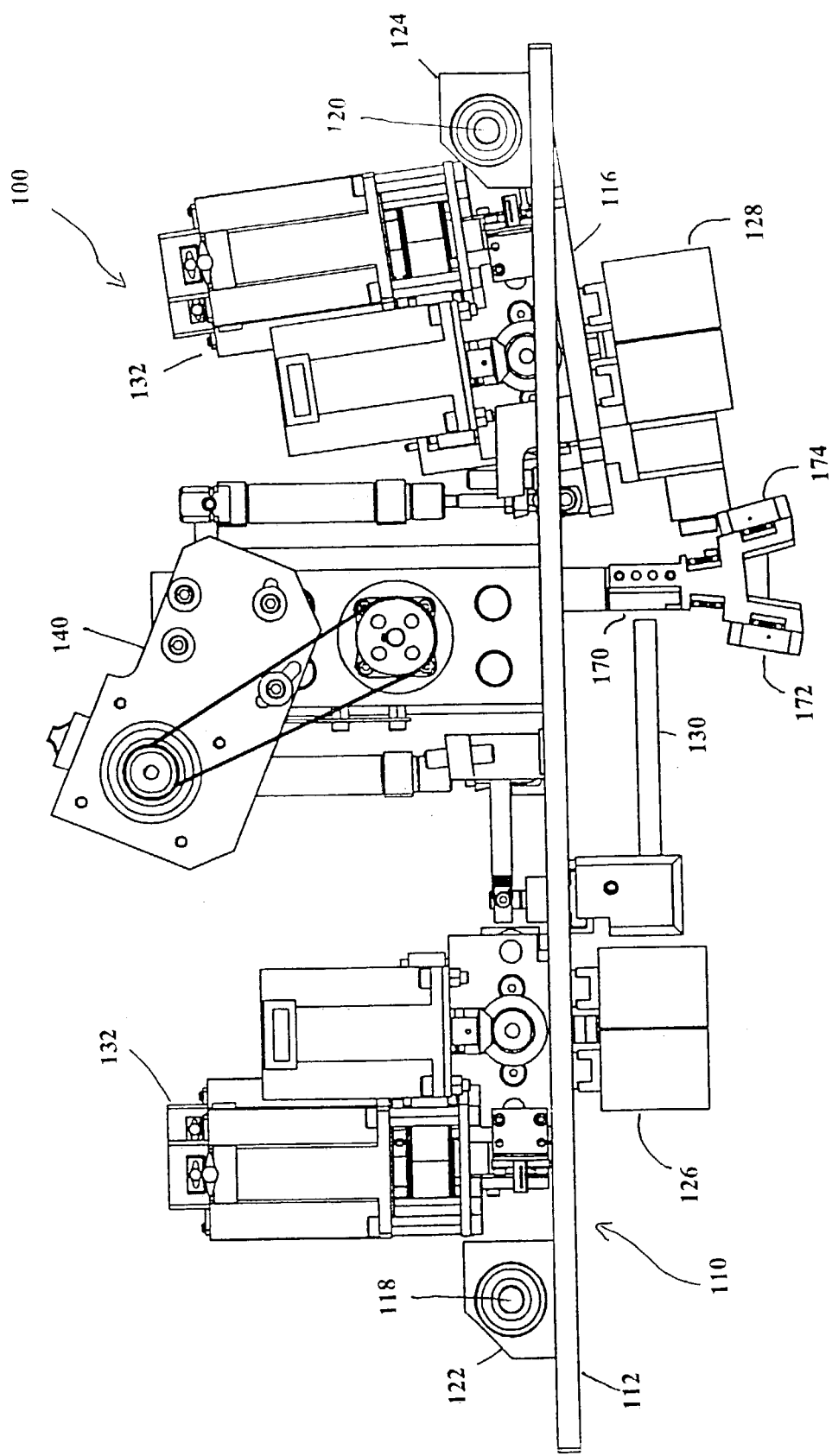
FIG. 7 shows a top view of the device shown in FIG. 1, in which the rear pivoting part is pivoted out into the position of the further processing unit, while the front pivoting part is pivoted into the position of the first processing unit.
Figure 8:
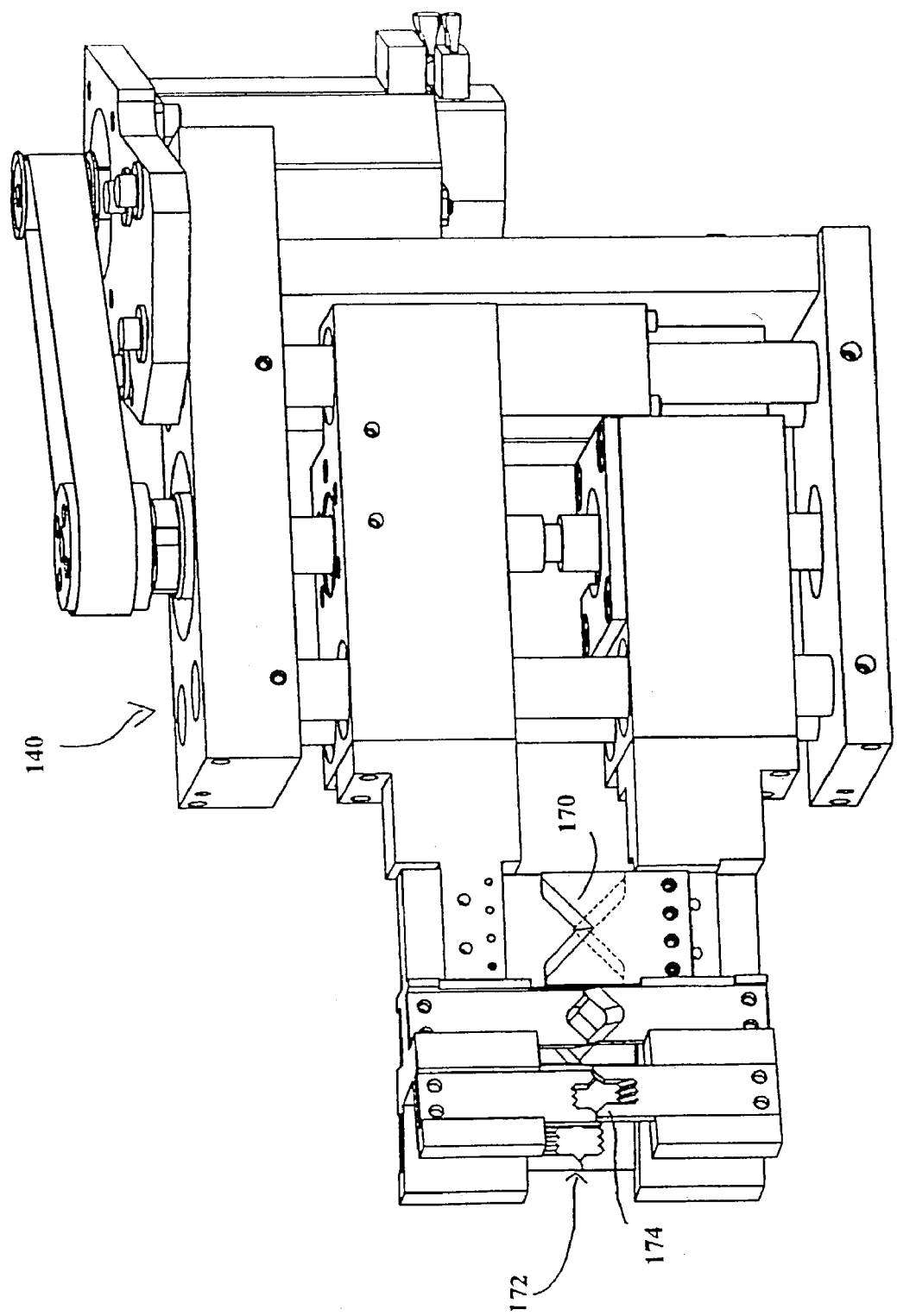
FIG. 8 shows a perspective illustration of the processing central part together with the associated supply devices.
Figure 9:
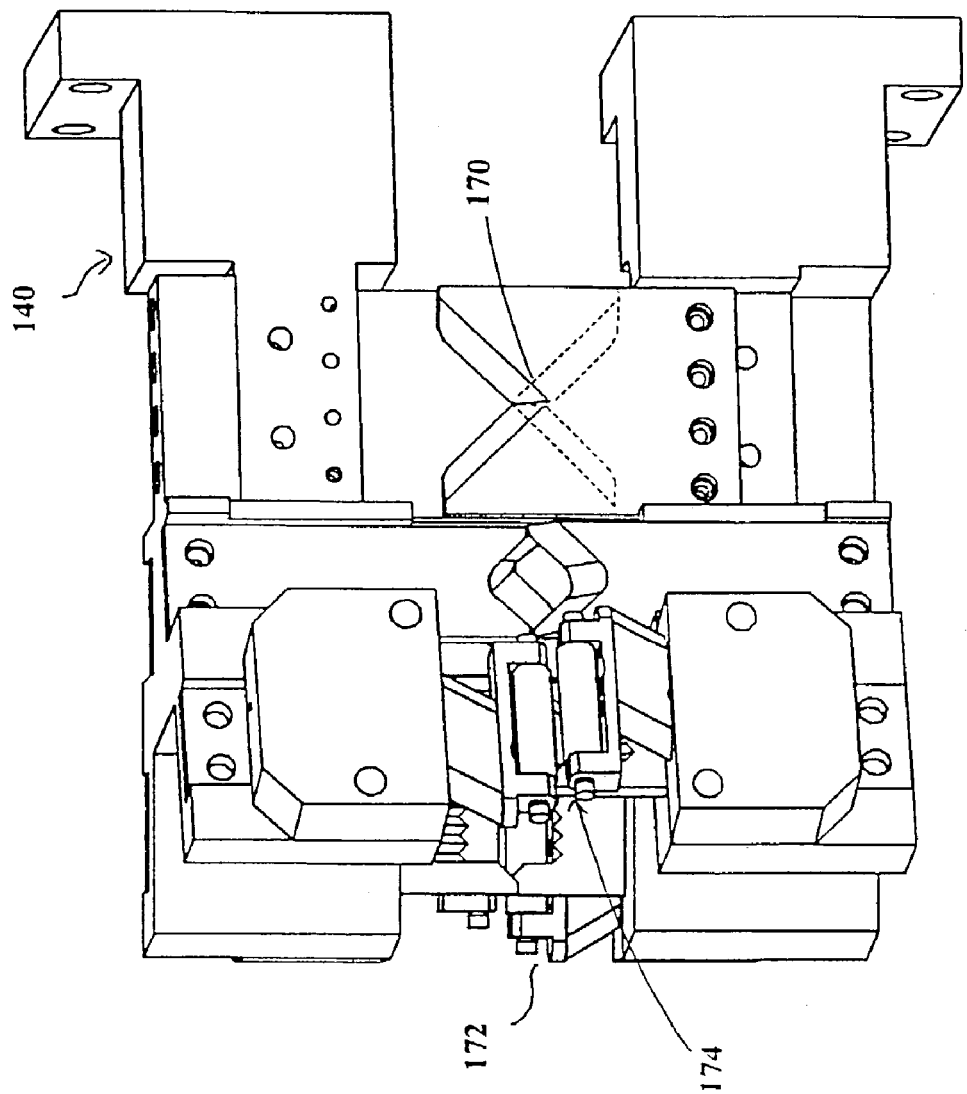
FIG. 9 shows a perspective illustration of the processing central part shown in FIG. 8 without the supply devices.

A first cable transport or cable conveyor device 126 for moving the conductor 200—shown in FIG. 2—alternately in two directions—forward and back—is mounted on the first pivotable plate part 114 on the front side—i.e., the cable side—the drive elements 132 being attached to the rear wall of the pivot plate 114. In the exemplary embodiment, the cable transport or cable conveyor device 126 is implemented as multiple conveyor rollers, however, any other drive elements for the conductor and/or the cable may also alternatively be used. Electric motors are provided as drive elements for the cable transport in the present exemplary embodiment, but other drive elements according to the related art may also be used for this purpose.

In addition, a guide sleeve 130, pivotable upward, in which the cable supplied is guided up to the processing unit 140, is positioned on the pivotable plate part 114 in the exemplary embodiment. After the cable is cut through—described below—and before the return of the cut off cable part, the guide sleeve 130 may be pivoted upward by an electromagnet and gives the rear end of the cut off cable part space for further processing, e.g., the stripping of the outer cable sheathing. This embodiment is expedient if the cable is to be cut through and stripped using the same blade.

A second cable transport device 128 is attached to a second pivotable plate part 116, this transport device again being implemented by multiple conveyor rollers, but any other drive elements able to be used alternatively for the conductor and/or the cable. In the present exemplary embodiment, electric motors are again provided as drive elements, but any other drive elements according to the related art may also be used for this purpose. The pivot axis of the second plate part 116 is provided—behind the plate 110—parallel to the pivot axis of the first pivotable plate part 114. For this embodiment, it is essential that the pivot direction be provided to the front for both pivotable plate parts 114 and 116, since in this way—in the exemplary embodiment described here—the accessibility to the cable-guiding and cable-processing parts is not impaired as in European Patent Application 1 174 970.

In the exemplary embodiment having pivoting of the plate parts 114 and 116 out of a base position, in which these plate parts 114 and 116 essentially form a plane with a baseplate 112—or alternatively, if this baseplate 112 is dispensed with, and only the two pivotable plate parts 114 and 116 form the plate 110, with one another—each in one pivoted-out position, a pneumatic pivot drive is used. In an expanded exemplary embodiment, in which the plate parts 114 and 116 are each to be pivoted out of the base position into, for example, two different positions, an electric pivot drive having a motor, for example, a stepping motor, is used. As an alternative to this, however, a pneumatic drive having two cylinders may also be used.

A processing module 140 having the processing units is introduced into an opening 150 of the plate 110. In this case, the cutting device 170, which is implemented as a cutting and stripping device for the outer sheathing, is primarily to be cited, whose operating point is on the line of the cable guide in the non-pivoted state of the pivoting parts 114, 116, and 130 cited. The first core stripping device 172 for the individual cores of the cable is provided before the cutting and stripping device 170 (viewed by an observer standing in front of the device) on this module 140. In this case, the arrangement is implemented in the exemplary embodiment so that these cutting tools are each made of three individual tools positioned next one another for simultaneous processing of up to three cores.

The first core stripping device 172 is aligned so that the front cable end points toward this device when the first pivotable plate part 114 is in the pivoted-out state. The supply of this cable end from the cutting and stripping device 170 for the outer sheathing to the core stripping device 172 is therefore performed by pivoting the first pivotable plate part outward. In this case, grippers, etc., which were previously typical, may be dispensed with. The first core stripping device 172 is implemented as replaceable in the exemplary embodiment, so that another processing device for the front cable end may also be used in its place.

The second core stripping device 174 for the individual cores of the cable is also provided in front of the cutting and stripping device 170 (viewed by an observer standing in front of the device) on the module 140. This device is also implemented so that the cutting tools each comprise three individual tools positioned next one another for simultaneous processing of up to three cores.

The second core stripping device 174 is aligned so that the rear cable end points toward this device when the second pivotable plate part 116 is in the pivoted-out state. The supply of this cable end from the cutting and stripping device 170 for the outer sheathing to the core stripping device 174 is thus performed by pivoting out the second pivotable plate part 116 without any gripper.

The module 140 is set up in the exemplary embodiment so that still further devices for attaching crimp parts and/or twisting the core end may be inserted in front of the two processing devices 172 and 174 described (viewed by an observer standing in front of the device). In this case, the two pivotable plate parts 114 and 116 are each pivoted out into a second pivot position, so that the front cable end and/or the rear cable end point toward the further processing devices and may be processed by them.

The invention claimed is:

1. A device (100) for processing cable-shaped conductors (200), particularly multicore cables, comprising
    at least one transport means (126) having a drive means (128) for transport supply and/or for lengthwise transport of cable-shaped conductor material,
    a cutting means (170) for cutting through the cable-shaped conductor material,
    at least one first means (170) for processing the cut, cable-shaped conductor material,
    at least one guide means (130) for lengthwise guiding of the cable-shaped conductor material,
    at least one plate (110), implemented essentially perpendicularly to the cable direction, on which at least some of the means (126, 128, 130) of the device are positioned on one side,
  wherein
    the plate (110) cited has at least one first pivotable plate part (114), which is pivotably positioned around an axis essentially parallel to a plate plane between two end positions using a first pivot angle, the at least one of the transport means (126) and the at least one guide means (130) being located on the plate part (114), and
    at least one second means (172) is provided for processing the cable-shaped conductor material, which is arranged in a state of the first pivotable plate part (114) pivoted out of the plane of the plate (110) or may be arranged replaceably.

2. The device according to claim 1,
  wherein
    the plate (110) cited has a second plate part (116), also pivotable in an axis parallel to the plate plane and in the direction of the first pivotable plate part (114), on which at least one further transport means (128) is arranged and is pivotable together with this second plate part (116) around a second pivot angle,
    the axes cited being provided in the regions of opposite ends of the plate parts (114, 116) and
    at least one third means (174) for processing a free end of the cut piece of the cable-shaped conductor material is arranged in a state of the second pivotable plate part (116) pivoted out of the plane of the plate (110) or may be arranged replaceably.

3. The device according to claim 1,
  wherein
    the first pivotable plate part (114) may be pivoted around a third pivot angle and at least one fourth means for processing a free end of the cable-shaped conductor material and/or the cut-off piece of the cable-shaped conductor material is arranged in a state of the first pivotable plate part (114) pivoted out of the plane of the plate (110) or may be arranged replaceably.

4. The device according to claim 2, wherein the second pivotable plate part (116) is pivotable using a fourth pivot angle and at least one fifth means for processing a free end of the cable-shaped conductor material and/or the cut-off piece of the cable-shaped conductor material is arranged in a state of the second pivotable plate part (116) pivoted out of the plane of the plate (110) or may be arranged replaceably.

5. The device according to claim 1, wherein the guide means (130) are implemented so that the free end of the cable-shaped conductor material may be pivoted out of its lengthwise direction.

6. The device according to claim 1, wherein the cutting means (170) for cutting through cable-shaped conductor material is also implemented as the first means (170) for processing the cut-through, cable-shaped conductor material.

\* \* \* \* \*